Nov. 3, 1942.  D. J. CIERI  2,300,725
EMERGENCY BRAKE FOR VEHICLES
Filed Jan. 16, 1942

INVENTOR.
BY DOMINICK J. CIERI.
Louis V. Lucia
ATTORNEY.

Patented Nov. 3, 1942

2,300,725

UNITED STATES PATENT OFFICE 2,300,725

EMERGENCY BRAKE FOR VEHICLES

Dominick J. Cieri, Hartford, Conn.

Application January 16, 1942, Serial No. 427,013

5 Claims. (Cl. 188—5)

This invention relates to emergency brakes for vehicles and more particularly to such brakes as shown and described in my co-pending application Serial No. 414,725, filed October 13, 1941, which are adapted to contact with the road to prevent skidding.

The present invention constitutes an improvement over the structure shown in said co-pending application and has for an object thereof to provide a device which is adapted to yieldingly grip the surface of the road so as to prevent damage to the brake mechanism and the vehicle as well as to the road.

A further object of this invention is to provide such a device in which the engagement of a road gripping member with the road surface and the braking action on the said vehicle may be controlled.

A still further object of this invention is to provide a braking device in which a braking action may be applied to a road gripping member, and thereby to the vehicle, in proportion to the pressure with which the said road gripping member is applied against the road surface.

Further objects and advantages of the present invention will be more clearly understood from the following description and from the accompanying drawing in which.

Figure 1:
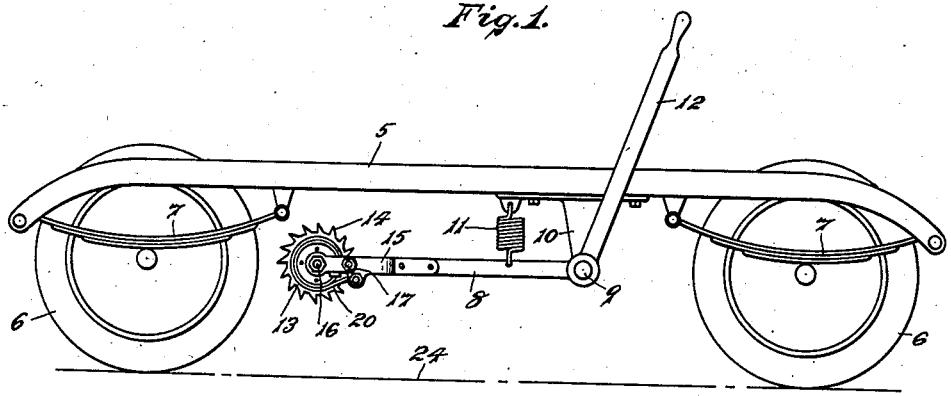
Fig. 1 is a side view, in central vertical section, of an emergency brake embodying my invention and showing the same attached to the frame of a motor vehicle.
Figure 2:
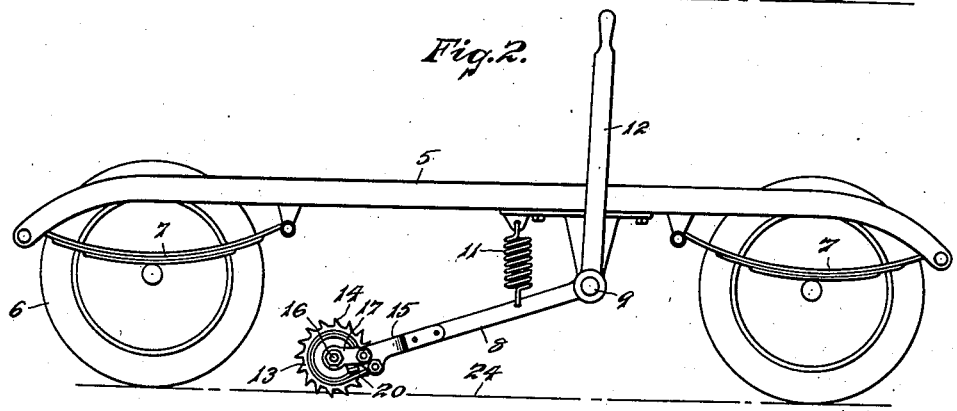
Fig. 2 is a similar view showing the brake in operative position.
Figure 3:
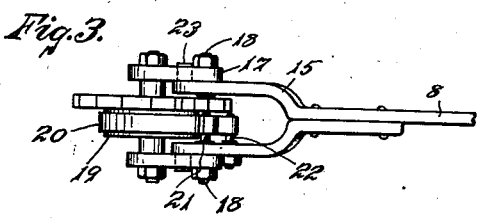
Fig. 3 is a plan view, on an enlarged scale, of the road engaging and braking mechanism.
Figure 4:
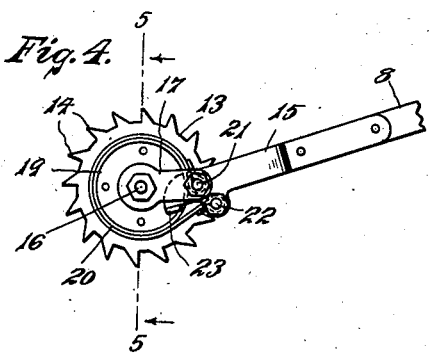
Fig. 4 is a side view thereof.
Figure 5:
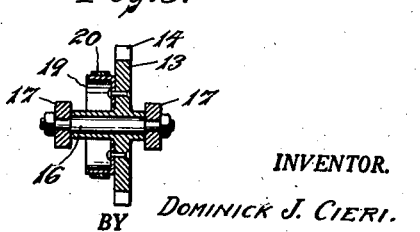
Fig. 5 is a view in central vertical section on line 5—5 of Fig. 4.

As illustrated in the drawing, the numeral 5 denotes the frame of a motor vehicle which is suspended on the conventional wheels 6 by the springs 7.

My improved emergency brake includes an arm 8 which may be pivoted, as at 9, to a bracket 10 that is secured to the frame 5. A spring 11, or other suitable means, may be employed for retaining said arm in its inoperative position and a hand lever 12 is attached to said arm for rocking the same on the pivot 9 for operating the braking mechanism.

The present invention provides a rotatable wheel 13 having teeth 14 which are adapted to bite into the surface of the road. The said wheel may be mounted within a fork 15, at the end of the bar 8, by means of a shaft 16 which is secured to and between link members 17 that are swivelly mounted to the ends of the fork 15 by means of pins 18.

The said wheel 13 is provided with a brake drum 19 which is rigidly secured thereto. A suitable brake band 20 surrounds said drum and has one end thereof secured to an anchoring pin 21 which may be co-axial with and extend from one of the swivel pins 18. The other end of said brake band is secured to an operating pin 22 which is secured to an arm of the fork 15.

The wheel 13 is supported in its normal position by stops 23, at the ends of the fork 15, which underly the links 17 when the wheel is in its inoperative position, as illustrated in Fig. 1. When in this position, the brake band 20 is loose upon the brake drum 19 to permit free rotation of the wheel 13.

The operation of my improved mechanism for an emergency brake is as follows.

When it is desired to apply a braking action to the vehicle, the operator may grasp the lever 12 and pull it in a rearwardly direction. This will rock the bar 8 on the pivot 9, against the tension of the spring 11, and bring the wheel 13 into contact with the road surface, indicated at 24, so that the teeth 14 on said wheel will grip the said surface.

Further pulling on the lever 12 will cause a rocking movement of the links 17 on the wheels 18. This will tend to move the operating pin 22, with relation to the anchoring pin 21, so as to tighten the brake band 20 around the brake drum 19 and thereby apply a braking action on the wheel 13 which will serve to brake the movement of the vehicle.

It will be seen from the above description that the amount of braking action applied to the wheel 13 may be controlled by the degree of pull applied to the lever 12 and that the extent to which the teeth 14 on the wheel 13 are forced into the road surface 24 is proportionate to the amount of braking action applied to said wheel. Therefore, the greater the force with which the teeth 14 are engaged with the road surface, the greater the braking action on the said wheel and, consequently, against the movement of the vehicle.

The operation of my improved emergency brake is particularly adapted for preventing damage to the road engaging member of the brake mechanism and to the brake device as well as the vehicle, when said road engaging member should strike an obstruction in the road, such a large stone, manhole cover or similar obstruction. For instance, if the road engaging member were rigid and it should strike such an obstruction in the road surface, the gripping member, the brake mechanism and the vehicle, as well as the road surface would be subject to damage by the resistance to the momentum in the vehicle.

With my improved mechanism, should the teeth 14 come into contact with an obstruction in the road surface, the said wheel would simply rotate over the obstruction, against the braking action applied thereto by the brake bar 20, and thereby prevent any sudden shock from such contact which would be liable to cause damage.

It will be further understood that the braking action applied to the wheel 13 is in proportion to the degree to which the teeth of the wheel are forced into contact with the road surface, so that the more the braking action which is applied to the wheel 13, for braking the movement of the vehicle, the firmer the gripping action between the wheel and the road.

This invention is of particular advantage for braking the movement of a vehicle on icy or otherwise slippery surfaces since it provides a means for firmly and yieldingly engaging said surfaces in proportion to the amount of braking action applied to the vehicle; thereby providing an emergency brake which is highly efficient under conditions where there is insufficient traction between the vehicle wheels and the road to permit effective operation of the conventional type of vehicle brakes.

It is to be also understood that while I have shown and described an emergency brake with a single road engaging wheel 13, two or more of said wheels may be provided for engaging the surface of the road upon the operation of the lever 12 and that, if desired, a brake operating foot pedal, such as shown in my co-pending application, may be used without departing from the scope of the present invention.

I claim:

1. For a vehicle, an emergency brake comprising a bar pivotly mounted to the frame of said vehicle, a toothed wheel rotatably and swivelly carried on said bar, and braking means adapted to apply a braking action against the rotation of said wheel when the same is forced into contact with the surface of the road.

2. For a vehicle, an emergency brake comprising a member movably mounted to the vehicle, an extension pivotly mounted to said member, a road engaging member rotatably mounted in said extension, means for moving said road engaging member into contact with the road surface, and means operated by the relative movement between said movably mounted member and said extension for applying a braking action to said road engaging member against the rotation thereof through its engagement with the road surface.

3. For a vehicle, an emergency brake including a bar pivoted to the vehicle, an extension pivotly mounted on said bar, a road engaging member rotatably mounted on said extension, a brake drum on said road engaging member, a brake band surrounding said brake drum; said brake band having one end thereof anchored at the fulcrum of the said extension and the opposite end secured to said bar at a point spaced from said fulcrum whereby, upon the forcing of said road engaging member with the road, the said extension will swing at the said fulcrum and cause tightening of said brake band around said drum to apply a braking action against the rotation of said road engaging member.

4. For a vehicle, an emergency brake including a bar pivoted to the vehicle, a fork on said bar, extensions pivotly mounted to the opposite sides of said fork, a road engaging member rotatably mounted on said extensions, a brake drum on said road engaging member, a brake band surrounding said brake drum; said brake band having one end thereof anchored at the fulcrum of the said extensions and the opposite end secured to said fork at a point spaced from said fulcrum whereby, upon the forcing of said road engaging member with the road, the said extension will swing at the said fulcrum and cause tightening of said brake band around said drum to apply a braking action against the rotation of said road engaging member.

5. For a vehicle, an emergency brake as set forth in claim 4 and including stop means for retaining the extension in normal position wherein a minimum of braking action is applied between the brake band and brake drum.

DOMINICK J. CIERI.